Feb. 3, 1970   R. S. HAHN ET AL   3,492,894
MACHINE TOOL
Filed Oct. 2, 1967   2 Sheets-Sheet 1

INVENTOR
Robert S. Hahn
Thomas R. Keefe
BY *Norman S. Blodgett*
ATTORNEY

United States Patent Office 3,492,894
Patented Feb. 3, 1970

3,492,894
MACHINE TOOL
Robert S. Hahn, Northboro, and Thomas R. Keefe, Framingham, Mass., assignors to The Heald Machine Company, Worcester, Mass., a corporation of Delaware
Filed Oct. 2, 1967, Ser. No. 672,287
Int. Cl. B23b 25/06
U.S. Cl. 77—3      7 Claims

ABSTRACT OF THE DISCLOSURE

A tool holder for a boring operation having the tool mounted on the spindle by means of a central rod and piezoelectric stacks angularly spaced about the central rod and means to cause the piezoelectric stacks to change their length to bring about adjustment of the radial distance of the cutting edge from the axis of rotation.

---

This invention relates to a machine tool and, more particularly, to apparatus arranged to produce a boring operation or the like in a workpiece.

In the machine tool industry, the problem of assuring that a tool moves in a circular path which is coaxial with the center of the rotating spindle to which it is attached is a common one. This problem has been accentuated by the increased use of machine tools which are numerically controlled and which are used with tool changers. The problem arises due to the inability to re-chuck a boring tool or the like, so that its cutting edge resides at precisely the same radial distance from the axis of rotation on each successive rechucking. As a result, size variations in the finished surfaces occur. These and other difficulties experienced with the prior art devices have been obviated in a novel manner by the present invention.

It is, therefore, an outstanding object of the invention to provide a machine tool in which a cutting tool can be attached to a rotating spindle in such a manner that the cutting edge of the tool sweeps exactly the desired radius each time it is rechucked.

Another object of this invention is the provision of a machine tool in which tool changing can take place using the same chuck with assurance that successive tools will generate surfaces which are all coaxial of the spindle and of one another.

A further object of the present invention is the provision of a machine tool having a novel tool adjustment.

It is another object of the instant invention to provide a machine tool having a control system for making non-circular bores.

It is a further object of the invention to provide a boring machine in which the tool is adjusted to generate a surface which is free of error in diameter.

A still further object of this invention is the provision of a boring machine having a chuck with a first means for locating roughing tools and with a second, more accurate means for locating finishing tools.

Another object of the present invention is the provision of a boring tool in which the cutting instrument can be readily retracted from the generated surface to prevent "drag line" during removal of the tool from the bore.

With these and other objects in view, as will be apparent to those skilled in the art, the invention resides in the combination of parts set forth in the specification and covered by the claims appended hereto.

Figure 1:
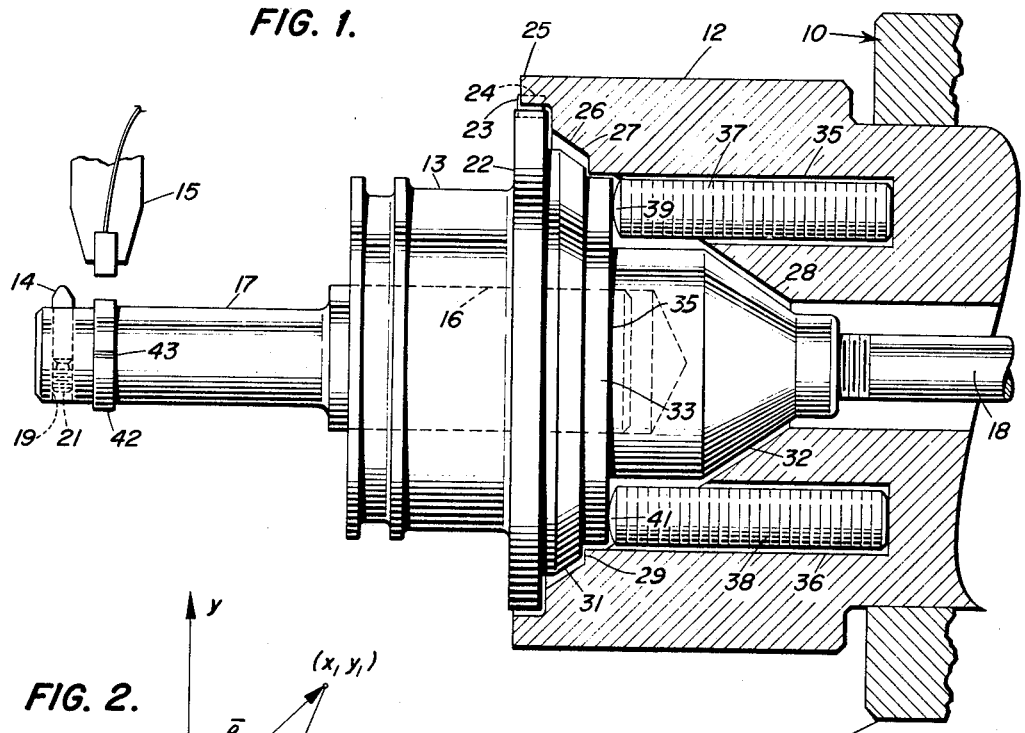
Figure 2:
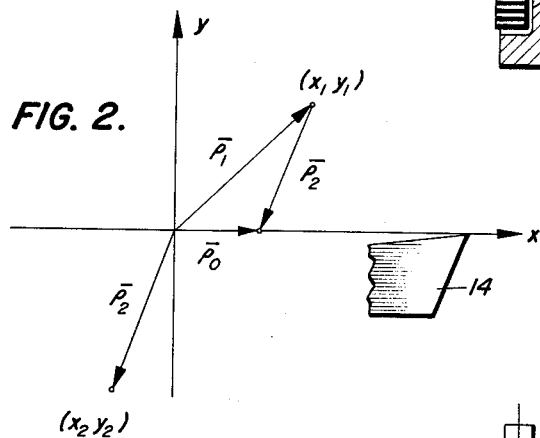
Figure 3:
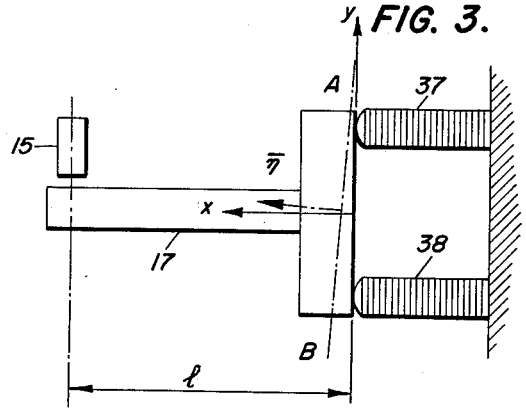
Figure 4:
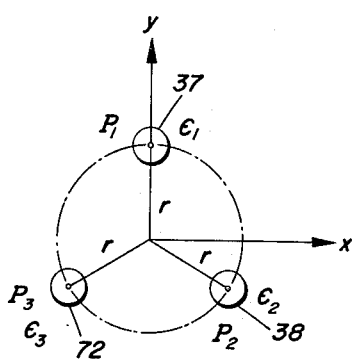
Figure 5:
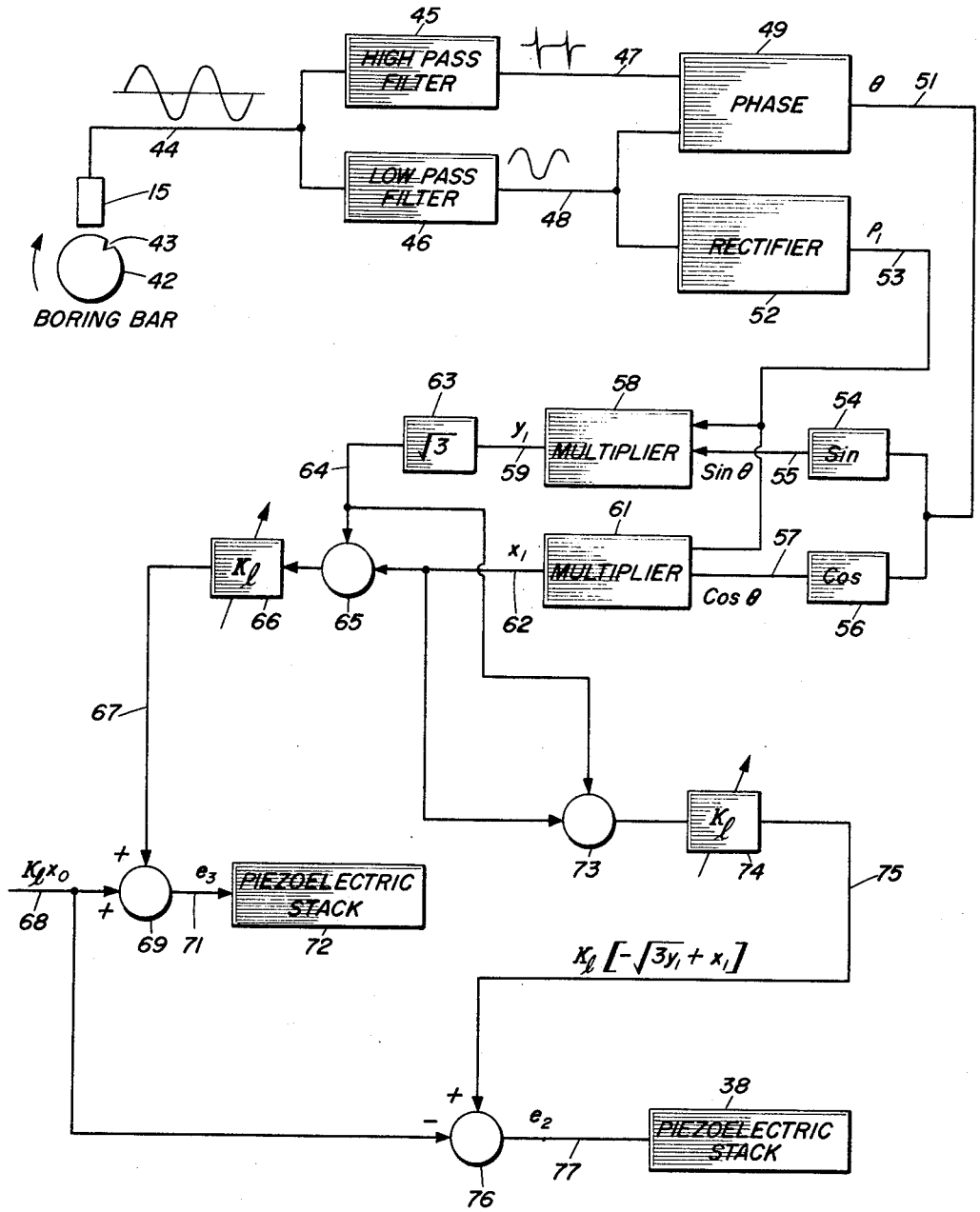

The character of the invention, however, may be best understood by reference to one of its structural forms as illustrated by the accompanying drawings in which:

FIG. 1 is a vertical sectional view partially in section of a machine tool embodying the principles of the present invention, FIG. 2 is a vector diagram showing relationships of the parts of the machine, FIG. 3 is a diagrammatic view of the apparatus, FIG. 4 is a further diagrammatic view of the operation of the apparatus, and FIG. 5 is a schematic view of electrical apparatus forming part of the invention.

In general, the present invention involves a tool holder mounted in the end of a rotatable spindle. The tool holder, when used for precision boring, is located axially on piezoelectric stacks. It is located radially by a reasonable fit in a bore and a small clearance exists at a tapered seat. It is angularly orientated by means of key and keyway. For milling, drilling, and other roughing tools, the tool holder is provided with a tapered seat and elastically compresses the piezoelectric stacks. With a precision boring bar in place and located on the piezoelectric stacks, the reference diameter will, in all probability, run out. The spindle carrier operating by numerical control, advances the bar so that a cylindrical sensing surface lies opposite a non-contacting pickup which reads the runout on the reference surface just behind the tool. The pickup not only reads the magnitude of the runout but also its location relative to a notch scribed in line with the tool point. Thus, both the amplitude and the phase of the run out is measured. This signal is sent to a closed-loop control system which produce one or more voltages which, in turn, are applied to the piezoelectric stacks in such a way as to cause the runout to be reduced to zero. The piezoelectric stacks, of course, can be expanded or contracted in response to an applied voltage. With the boring bar running true, the hole can be bored to size. In the event that tool wear takes place and the size has drifted away from a predetermined value, the stacks can be biased with a voltage to cause very small size adjustments to be made. The tool can also be retracted on runout by this means to avoid a drag line.

Referring first to FIG. 1, wherein are best shown the general features of the invention, the machine tool, indicated generally by the reference numeral 10, is shown as having a housing 11 in which is rotatably mounted a spindle 12 on which is carried a tool mount 13. At the other end of the tool is mounted a cutting element or bit 14. Associated with the tool mount 13 is a non-contacting pickup 15. The tool mount 13 is provided with a cylindrical bore 16 in which is mounted a precision boring bar 17 on the outer end of which the bit 14 is mounted. Secured to the inner end and extending through a bore in the spindle 12 is a rod 18. The bit is mounted in a transverse passage 19 extending through the outer end of the boring bar 17 and is located by means of a screw 21. The tool mount 13 is provided with an outwardly-extending circular flange 22, the outer periphery of which is formed with a key 23. This key locates in a keyway 24 formed on the inner periphery of an axial flange 25 which is formed on the lower end of the spindle 12. The spindle 12 is provided with a conical bore 26 which is provided with an outer portion 27 and an inner portion 28. The tool mount 13 is provided with a conical portion 31 which lies adjacent the outer portion 27 of the bore 26, but is separated therefrom by a small gap. Similarly, it is provided with a conical portion 32 which lies adjacent and slightly separated from the inner portion 28 of the bore 26. The flange is also provided with a radical surface 34 which faces toward the main body of the spindle 12. The spindle is provided with three axial bores equi-distantly spaced around the axis of the rod 18, and in the bores are mounted stacks of piezoelectric elements. In FIG. 1 only the bores 35 and 36 are shown as carrying stacks 37 and 38 of piezoelectric crystals. The outermost crystals are provided with rounded caps 39 and 41, respectively, which press against the radical surface 34.

The outer end of the boring bar 17 adjacent the bit 14 is provided with a flange having a cylindrical surface 42 which is very accurately formed to be coaxial of the axis of the boring bar. This surface is adapted, on occasion, to lie adjacent the pickup 15 and is provided with a slight longitudinal notch 43. Suitable means are provided for energizing the piezoelectric crystals on occasion, as will be described more fully hereinafter.

The operation of this portion of the invention will be readily understood, in view of the above description. The machine tool 10 is a numerically-controlled work center having a work changing means similar to that shown in the patent of Alden H. Jacobson et al., No. 3,266,141, and having means for introducing various tools into the spindle 12 for successive machining operations. The tool shown being used in FIG. 1 is for finish boring operations. It must be assumed, therefore, that similar roughing tools have been used previous to the use of the present tool; the roughing tools were located by means of the outer portion 27 and the inner portion 28 of the bore 26. The roughing tools were provided with conical elements similar to the conical elements 31 and 32 on the tool mount 13. In the case of the roughing tools, an element similar to the radial flange 33 is provided and has an outer peripheral surface which is considerably spaced inwardly from the surface of the counterbore 29, so that it is loose in that area but tight against the conical portions. These roughing tools would compress the stacks elastically and the stacks are negatively charged to contract them. In the present case, however, the precision tool mount 13 is put in place with the teeth 24 engaging the teeth 23 in driving relationship. The tool is held against the stacks 37 and 38 by the rod 18. With the new tool in place, the spindle 12 is rotated in the usual manner relative to the housing 11 and the bit 14 moves in a circular path with the boring bar 17. The elements are advanced axially to generate a cylindrical surface in the workpiece. Before the bit 14 is advanced into the workpiece, however, the numerical control of the machine indexes the boring bar 17 downwardly to the point where the cylindrical surface 42 lies opposite the pickup 15. The pickup senses the distance from its head to the surface 42 and this determines the amount of runout; not only that, but the greatest throw of the runout is shown as having a certain angular relationship to the notch 43. The correction of this runout is brought about by introducing more or less voltage to the piezoelectric stacks 37 and 38 to rock the tool mount in the spindle and change the angular aspect of the boring bar 17. In a similar way, the distance from the axis of the boring bar to the cutting edge of the bit 14 can be adjusted to produce the proper diameter in the finished internal surface.

For a mathematical analysis of the effect of introducing current to the piezoelectric stacks, one must refer to FIGS. 2, 3, and 4. Let $\epsilon_1$, $\epsilon_2$, $\epsilon_3$ = displacement of piezoelectric stacks at the plane AB (see FIG. 3). The unit normal vector $\bar{n}[a, b, c]$ is given by:

$$a(x-x_1)+b(y-y_1)+c(z-z_1)=0 \qquad (1)$$

where $a, b, c$ are components of $\bar{n}$.

The coordinates of $$P_1[o, r, \epsilon_1]$$

$$P_2\left[\sqrt{\frac{3}{2}}r, -\frac{r}{2}, \epsilon_2\right]$$

$$P_3\left[-\sqrt{\frac{3}{2}}r, -\frac{r}{2}, \epsilon_3\right]$$

For points $P_1$ and $P_2$, and $P_1$ and $P_3$ $$a\left(\sqrt{\frac{3}{2}}r-0\right)+b\left(-\frac{r}{2}-r\right)+c(\epsilon_2-\epsilon_1)=0$$

$$a\left(-\sqrt{\frac{3r}{2}}-0\right)+b\left(-\frac{r}{2}-r\right)+c(\epsilon_3-\epsilon_1)=0$$

$$\sqrt{\frac{3}{2}}ra-\frac{3}{2}rb+c(\epsilon_2-\epsilon_1)=0$$

$$-\sqrt{\frac{3}{2}}ra-\frac{3}{2}rb+c(\epsilon_3-\epsilon_1)=0$$

$$\frac{b}{c}=\frac{\epsilon_2-\epsilon_1-\epsilon_3-\epsilon_1}{3r}$$

$$\frac{a}{c}=\frac{\epsilon_3-\epsilon_1-(\epsilon_2-\epsilon_1)}{\sqrt{3r}}=\frac{\epsilon_3-\epsilon_2}{\sqrt{3r}}$$

Taking $c=1$ gives the components of $\bar{n}$ as $$\bar{n}\left[\frac{\epsilon_3-\epsilon_2}{\sqrt{3r}}, \frac{\epsilon_3-\epsilon_1+\epsilon_2-\epsilon_1}{3r}, l\right] \qquad (2)$$

The components in the plane of the tool point are $$\left[\frac{\epsilon_3-\epsilon_2}{\sqrt{3}}\frac{l}{r}, \frac{\epsilon_3-\epsilon_1+\epsilon_2-\epsilon_1}{3}\frac{l}{r}, l\right] \qquad (3)$$

In the plane of the tool point:
$\bar{\rho_1}$ = Random runout vector (measured)
$\bar{\rho_2}$ = Piezoelectrically generated correction vector
$\bar{\rho_0}$ = Desired input vector for size control From FIG. 2:

$$\bar{\rho_0}=\bar{\rho_1}+\bar{\rho_2} \qquad (4)$$

and $$X_0=X_1+X_2$$
$$Y_0=0=Y_1+Y_2 \qquad (5)$$

From these equations:

$$X_2=X_0=-X_1$$
$$Y_2=-Y_1 \qquad (6)$$

Now, from expression 3:

$$X_2=\frac{\epsilon_3-\epsilon_2}{\sqrt{3}}\frac{l}{r} \quad Y_2=\frac{\epsilon_3-\epsilon_1+\epsilon_2-\epsilon_1}{3}\frac{l}{r}$$

The strain $\epsilon_1$ may arbitrarily be fixed and set to 0, so that:

$$X_2=\frac{\epsilon_3-\epsilon_2}{\sqrt{3}}\frac{l}{r} \quad Y_2=\frac{\epsilon_3+\epsilon_2}{3}\frac{l}{r} \qquad (7)$$

Solving for $\epsilon_2$ and $\epsilon_3$ $$\epsilon_2=\left[\sqrt{\frac{3}{2}}\frac{r}{l}\sqrt{3}\,Y_2-X_2\right]$$

$$\epsilon_3=\sqrt{\frac{3}{2}}\frac{r}{l}[\sqrt{3}\,Y_2+X_2] \qquad (8)$$

Taking the piezoelectric constant as $K_p$, $$\epsilon=K_p e$$

where $e$ is the voltage on the piezoelectric stack. Then the piezoelectric voltages are:

$$e_2=\frac{1}{K_p}\quad \epsilon_2=\sqrt{\frac{3}{2}}\frac{r}{lK_p}[\sqrt{3}\,Y_2-X_2]=K_1[\sqrt{3}\,Y_2-X_2]$$

$$e_3=\frac{1}{K_p}\quad \epsilon_3=\sqrt{\frac{3}{2}}\frac{r}{lK_p}[\sqrt{3}\,Y_2+X_2]=K_1[\sqrt{3}\,Y_2+X_2]$$

$$(9)$$

where $$K_1=\sqrt{\frac{3}{2}}\frac{r}{lK_p}$$

Substituting $X_2$ and $Y_2$ from Equation 6:

$$e_2 = K_1[-\sqrt{3}\ Y_1 + X_1] - K_1 X_o$$
$$e_3 = K_1[-\sqrt{3}\ Y_1 - X_1] + K_1 X_o \qquad (10)$$

With this relationship between the operation of the piezoelectric stacks and the tool point, the control equipment shown in FIG. 5 will be readily understood. The pickup 15 resides adjacent the cylindrical surface 42 with its notch 43. The signal generated electromagnetically in the pickup is carried through a line 44 to a high pass filter 45 and a low pass filter 46. Now, as can be seen in the small figure overlying the line 44, the signal in the line 44 is a sine wave which represents the variation in distance between the pickup 15 and the surface 42, the smooth sine wave being interrupted by a spike. The spike portion only of this signal is passed from the output of the high pass filter 45 onto a line 47, while the sine wave only passes through the low pass filter onto a line 48; both lines 47 and 48 are connected to the input side of a phase analyzer 49 whose output 51 is indicative of the angle between the high point of the sine wave on the line 48 and the position of the spike 47. This angle is indicative of the relationship of the point of greatest runout relative to the notch 43. The line 48 is also connected to a rectifier 52 which introduces a signal onto a line 53 which is indicative of $\rho_1$; that is to say, the amount of runout. The line 51 is connected, first of all, to a circuit 54 whose output onto a line 55 is indicative of the sine of the angle $\theta$ and to a circuit 56 which introduces onto a line 57 a signal indicative of the cosine of the angle $\theta$. The line 53 and the line 55 introduce their values into a multiplier 58 which introduces onto an output line 59 a signal indicative of the value $Y_1$ in Equation 6 above. Similarly, the line 53 and the line 57 are introduced into the input of a multiplier 61, the output of which is connected to a line 62 which receives from the multiplier a value indicative of $X_1$ shown in Equation 6 above. The value of $Y_1$ on line 59 is introduced into an operating circuit 63 which multiplies it by $\sqrt{3}$ and the resultant value appears on a line 64. The value of $\sqrt{3Y_1}$ on the line 64 is added to the value of $X_1$ on line 62 in a circuit 65 and the resultant is introduced into a circuit 66 which multiplies it by the value of $K_1$, the result appearing on a line 67. The value of $K_1 X_o$ appears on a line 68 and the signals from the line 68 and the line 67 are introduced to a circuit 69 which adds them and introduces them to a line 71 connected to the piezoelectric stack 72. This makes an adjustment in the stack length. At the same time, the line 64 and the line 62 are connected to a circuit 73 and the result is introduced to a circuit 74 which multiplies it by $K_1$ and the result appears on a line 75. The line 75 is connected to a circuit 76 as is the line 68 and the output of that circuit is introduced on a line 77 connected to the piezoelectric stack 38 to make adjustments in its length. The adjustments of the piezoelectric stacks 38 and 72 will cause suitable movement of the point of the bit 14 to correct for lack of concentricity of the tool in the spindle 12, so that the tool may be used in an automatic machine without the necessity of an operator centering the tool every time a tool change is made. This removes one of the difficulties experienced in the past in the use of the tool changing procedures in numerically-controlled machine tools. That is to say, it is practically impossible with a conventional tool changer to locate the tool accurately in the spindle when changes are taking place many times in a short period of time. It will be understood that changes in diameter of the hole being bored can be made by adjustments in the signal on the line 68; that is to say, the value of $K_1 X_o$.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   (a) a rotatable spindle,
   (b) a holder mounted in the spindle for rotation therewith,
   (c) an expandible element consisting of a stack of piezoelectric material interposed between the spindle and the tool holder, and
   (d) means for introducing a signal to the expandible element to cause it to change its length and bring about adjustment of the radial distance of the cutting edge from the axis of rotation.

2. A machine tool as recited in claim 1, wherein the holder is provided with a radial surface facing away from the operative end of the holder and the spindle is provided with a bore extending axially of the spindle and opening in the direction of the radial surface and wherein the stack resides in the bore with one end engaging the bottom of the bore and the other end engaging the radial surface on the holder.

3. A machine tool as recited in claim 2, wherein there are three such bores arranged equidistantly from the axis of the spindle and at least one of them carry piezoelectric stacks.

4. A machine tool as recited in claim 1, wherein a pickup is associated with the holder to read the degree of runout, wherein a control circuit receives a signal indicative of the degree of runout, and wherein the control circuit is connected to the expandible element to adjust the position of the holder relative to the axis of rotation of the spindle to compensate for the said runout.

5. A machine tool, as recited in claim 4, wherein the pickup provides signals indicative of both the amount of runout and the angular position of its maximum value.

6. A machine tool as recited in claim 5, wherein control circuit receives the signals from the pickup and converts them to a signal for impression on the expandible element in accordance with the equation:

$$e_2 = K_1[-\sqrt{3Y_1} + X_1] - K_1 X_o$$
$$e_3 = K_1[-\sqrt{3Y_1} - X_1] + K_1 X_o$$

$e_2$ and $e_3$ = control signals on a particular expandible element necessary to compensate for runout.

$K_1$ = a parameter taking into consideration the length of the boring bar and the expansion constant of the expandible elements.

Y = distance of center of boring bar in plane of the pickup from spindle axis along a Y axis.

X = distance of center of boring bar in plane of pickup from the spindle axis along the X axis.

$X_o$ = arbitrary distance from the spindle axis to the center of the boring bar.

7. A machine tool as recited in claim 4, wherein the pickup on occasion lies opposite a cylindrical surface formed on the tool holder so that a sinusoidal wave of electrical current is generated in the pickup, the amplitude of which is indicative of the amount of the runout, the cylindrical surface having a break in its continuity to produce an electrical spike in the current, the spike permitting a determination of the angular position of the point of maximum runout relative to the break.

References Cited

UNITED STATES PATENTS

| | | | |
|---|---|---|---|
| 3,007,356 | 11/1961 | Jones | 77—3 |
| 3,217,568 | 11/1965 | De Graffenried | 77—3 |
| 3,237,486 | 3/1966 | Gilbert et al. | 77—1 |

GERALD A. DOST, Primary Examiner

U.S. Cl. X.R.

33—185; 77—58